INVENTOR:
ERNEST M. POLLARD,
BY William Friedman
ATTORNEY

United States Patent Office 3,450,894
Patented June 17, 1969

3,450,894
SURGE SUPPRESSING MEANS FOR
STATIC CIRCUIT BREAKERS
Ernest M. Pollard, Cherry Hill, N.J., assignor to General
Electric Company, a corporation of New York
Filed Dec. 15, 1966, Ser. No. 601,965
Int. Cl. H02h 7/20
U.S. Cl. 307—202                           3 Claims

ABSTRACT OF THE DISCLOSURE

Surge suppressing means for protecting a polyphase static circuit breaker from voltage surges arising on either side of the breaker. The static breaker comprises diode bridges in each phase of the power circuit. A single surge suppressor common to all phases is connected in protective relationship with the circuit breaker by a rectifier network that includes the diodes in the bridges, as well as auxiliary diodes.

BACKGROUND OF THE INVENTION

Field of the invention

This invention relates to surge suppressing means for static circuit breakers and is particularly concerned with surge suppressing means for static A-C circuit breakers of the type comprising a diode bridge for producing unidirectional current flow through the interrupting component of the circuit breaker.

The circuit breaker with which I am concerned is a polyphase A-C circuit breaker in which the circuit interrupting elements are controlled rectifiers connected in series with the respective phases of the polyphase circuit. The controlled rectifier in each phase is connected in a diode bridge circuit that produces a unidirectional flow of current through the controlled rectifier irrespective of the polarity of the current through the phase.

Description of the prior art

For protecting such a circuit breaker against voltage transients, it has been proposed to provide a single surge suppressor common to all phases of the circuit. When it is desired to protect against surges arising on a particular side of the breaker, this surge suppressor has been connected to that particular side of the bridge circuits through a suitable rectifying network.

SUMMARY

For protecting against surges which might arise on either side of the breaker, two separate rectifying networks can be used, one connecting the surge suppressor to the source side and the other to the line side of the bridge circuits. A disadvantage of this approach is its complexity and cost. For a three phase circuit, twelve separate diodes are needed in the rectifying networks for connecting the surge suppressor to opposite sides of the bridge circuits.

An object of the present invention is to reduce the number of doides needed to connect a surge suppressor of this type to a polyphase A-C power circuit, yet without detracting from the ability of the surge suppressor to protect against voltage surges arising at either side of the circuit breaker.

BRIEF DESCRIPTION OF THE DRAWING

For a better understanding of the invention, reference may be had to the following description taken in conjunction with the accompanying drawing, wherein.

DESCRIPTION OF PREFERRED EMBODIMENTS

Figure 1:
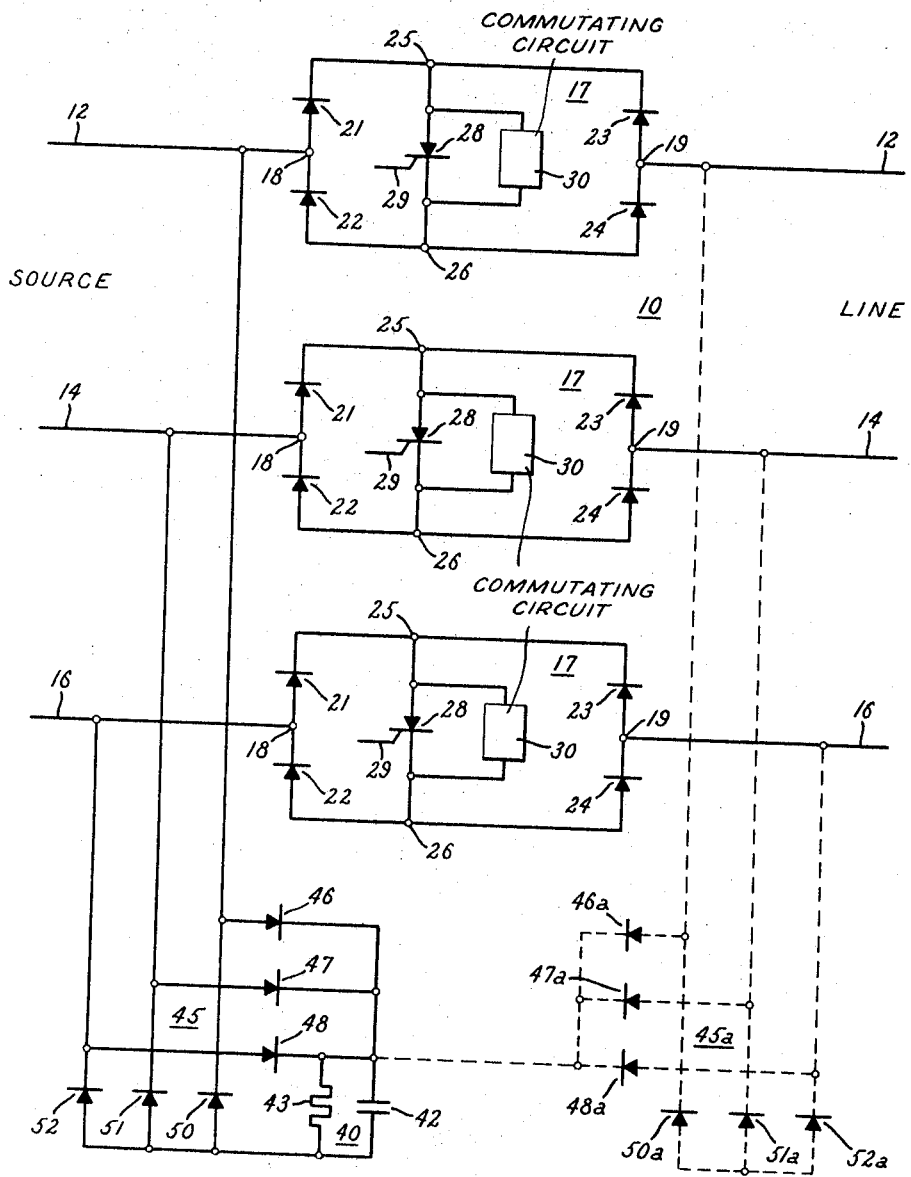
FIG. 1 is a circuit diagram showing a surge suppressor combined with a polyphase static circuit breaker. The solid line portions of the diagram represent prior art.

Referring now to FIG. 1, there is shown a three phase static circuit breaker 10 for controlling current through the three phases 12, 14 and 16 of a polyphase A-C power circuit. This circuit breaker comprises three identical circuit-controlling components 17, one for each phase of the circuit, and therefore only one will be described in detail.

Each circuit-controlling component 17 comprises a diode bridge connected in its associated phase between a source terminal 18 and a line terminal 19. Each diode bridge comprises four diodes 21, 22, 23 and 24 connected in a conventional rectifying bridge circuit. Diodes 21 and 23 are connected to a common junction point 25, and diodes 22 and 24 are connected to a common junction point 26.

Connected between these two junction points 25 and 26 is an interrupting element in the form of a silicon controlled rectifier 28 of a conventional design. The conductivity of the controlled rectifier 28 is controlled by a current signal applied to the usual gate 29 of the controlled rectifier. This signal, which may be derived in any conventional manner, is normally maintained on the gate, thereby normally permitting current to flow through the rectifier in a direction from point 25 to 26.

When the source terminal 18 of the circuit controlling component 17 is positive with respect to line terminal 19, current flows through the component 17 via diode 21, controlled rectifier 28, and diode 24. When the line terminal 19 is positive with respect to the source terminal 18, current flows through the circuit-controlling component 17 via diode 23, controlled rectifier 28, and diode 22. Thus, irrespective of the Polarity of the current in phase 12, current flows through the controlled rectifier 28 from point 25 to point 26.

For interrupting the circuit, a suitable commutating circuit 30 is connected across the controlled rectifier 28. This commutating circuit 30 is normally maintained open; but when it is closed, a commutating current is caused to flow through a loop circuit comprising the commutating circuit 30 and the silicon controlled rectifier 28, thereby driving the current through the controlled rectifier to zero. The gate signal is removed from the controlled rectifier gate 29 prior to this instant, and this permits the controlled rectifier 28 to become non-conductive at current zero, thereby interrupting the circuit. The commutating circuit can be of a suitable conventional design, such as shown, for example, in U.S. Patent 3,133,209—Greenwood et al., or in U.S. Patent 3,042,838—Bedford et al., both assigned to the assignee of the present invention.

When an interrupting operation is to take place, the commutating circuits 30 in all three phases are closed, or activated, and this renders the controlled rectifiers 28 of all three phases non-conductive, thereby effectively interrupting the current through all three phases.

For protecting the controlled rectifiers 28 against voltage transients that might arise on the source side of the circuit breaker, a surge suppressor 40 in the form of a capacitor 42 having a bleed resistor 43 connected thereacross is provided. For enabling the surge suppressor 40 to protect against voltage transients that might be present on any one of the three phases, it has been proposed in the prior art that a rectifying network 45, as shown in FIG. 1, be provided for connecting the surge suppressor 40 to all three phases 12, 14 and 16. This rectifying network 45 comprises three auxiliary diodes 46, 47 and 48 respectively connecting the three phases to the upper terminal of surge suppressor 40 and three additional auxiliary diodes 50, 51 and 52 respectively connecting the three phases to the lower terminal of the surge suppressor. These auxiliary diodes effectively connect the capacitor 42 across all three phases of the power circuit. Should a voltage in excess of normal line-to-line source voltage develop on the source side of the system, its peak magnitude is materially reduced by the capacitor 42. This capacitor 42, which may be quite large, absorbs the excess energy of the voltage surge and thus protects the controlled rectifiers 18 from damage by this excess energy.

If the surge suppressor 40 is connected to the power circuit only at the source side of the circuit breaker 10, it can absorb voltage surges arising only on the source side of the breaker. To render the surge suppressor capable of protecting against voltage surges arising on the line side, as well as the source side, an additional rectifying network 45a can be provided for connecting the surge suppressor to the line side of the circuit breaker 10. This additional network 45a may be substantially identical to the rectifying network 45 and is shown in dotted line form. Corresponding components are designated by the same reference numerals, except that the suffix *a* has been attached to the reference numerals of network 45a.

It will be noted that using the approach of FIG. 1 requires twelve separate auxiliary diodes to render the surge suppressor 40 capable of protecting against surges arising on either side of the three-phase circuit breaker 10.

As pointed out hereinabove, an object of my invention is to obtain the same protection without requiring such a large number of auxiliary diodes. For realizing this objective, I provide the circuit of FIG. 2. In this circuit, some of the main diodes present in the bridge of each circuit-controlling component 17 are utilized for forming a part of the rectifying network which connects the surge suppressor to the power circuit.

In this circuit the surge suppressor 40 is, in effect, connected across each of the controlled rectifiers 28 in the three phases. The top terminal of the surge suppressor 40 is connected to the top terminal 25 of the three controlled rectifiers through diodes 60, 61 and 62, respectively. The lower terminal of the surge suppressor 40 is connected to the lower terminal 26 of the three controlled rectifiers 28 through diodes 64, 65 and 66, respectively. The diodes associated with a given controlled rectifier 28 are poled to conduct in the same direction as that particular controlled rectifier. For example, the controlled rectifier 28 of the bottom phase conductor 16 normally conducts current from point 25 to 26, whereas diodes 60 and 64, which are associated with the same phase, are poled also to conduct current from point 25 to 26.

Figure 2:
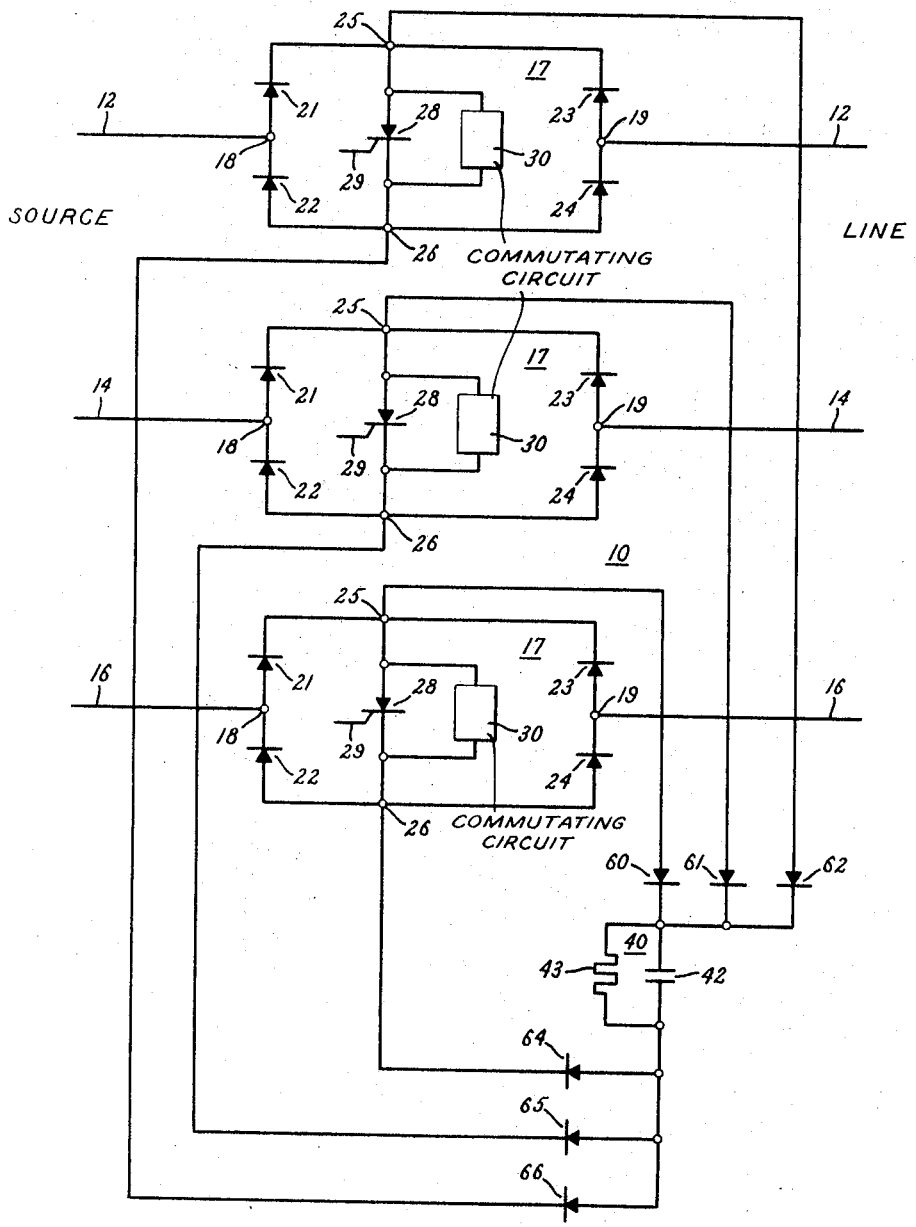
FIG. 2 is a circuit diagram illustrating one embodiment of my invention.

If a voltage surge on the lower phase 16 should arise on the line side of the circuit breaker of FIG. 2, it is applied to the surge suppressor 40 through diodes 23 and 60 connecting the line terminal of the circuit controlling component 17 to the upper terminal of the surge suppressor 40 and diodes 64 and 22 connecting the source terminal of the bridge to the lower terminal of the surge suppressor 40.

If a voltage surge on the lower phase 16 should arise on the source side instead of the line side of the circuit breaker of FIG. 2, it is applied to the surge suppressor 40 through diodes 21 and 60 connecting the source terminal 18 to the upper terminal of the surge suppressor and diodes 64 and 24 connecting the line terminal 19 to the lower terminal of the surge suppressor.

Voltage surges appearing on the other two phases of the power circuit are handled in a corresponding manner to that described for surges on phase 16.

It should also be noted that surge suppressor 40 is capable of protecting against excessive phase-to-phase voltages. In this respect, note that the surge suppressor 40 is connected between phase conductors 14 and 16 at the source side of the breaker by a circuit that extends from conductor 14 through elements 21, 61, 40, 64 and 22 to conductor 16 when conductor 14 is positive with respect to 16. When conductor 16 becomes positive with respect to 14, a circuit extending from 16 to 14 via elements 21, 60, 40, 65, 22 is available to absorb surges. Likewise, the surge suppressor 40 is connected between conductors 14 and 12 through a circuit that extends from conductor 14 through elements 21, 61, 40, 66 and 22 to conductor 16. A similar circuit is present between phase conductors 12 and 16. In a similar manner, the surge suppressor 40 is connected between each of the phase conductors on the line side of the circuit breaker.

Although up to this point I have discussed only surges developed by sources outside the circuit breaker, surges may also be developed by the circuit breaker itself upon operation. Since my surge suppressor 40 is connected across each controlled rectifier 28 and also between the phases, it can protect the controlled rectifier against such internally generated surges, as well as the externally generated surges already mentioned.

It will be noted that the surge suppressing means of FIG. 2 requires only six auxiliary diodes (60–66) instead of the twelve auxiliary diodes of FIG. 1. Despite this greatly reduced number of diodes, the surge suppressing means of FIG. 2 is still able to effectively protect the controlled rectifiers 28 from surges arising on either the source or the line side of the circuit breaker and on any phase of the power circuit.

Figure 3:
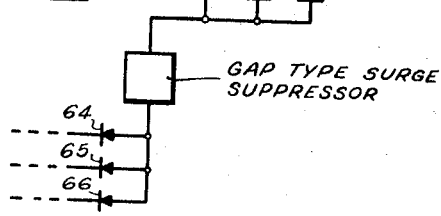
FIG. 3 is a circuit diagram illustrating a portion of a modified form of the invention.

Although I have shown the surge suppressor as one which comprises a surge-absorbing capacitor 42, it is to be understoood that other types of surge suppresors can be used instead of the capacitor-type suppressor. For example, a gap-type surge compressor such as shown and claimed in application S.N. 298,942—Lee and Liao, filed July, 31, 1963, now Patent No. 3,309,555 and assigned to assignee of the present invention, can be substituted; or some other type of suitable breakdown device can be substituted. FIG. 3 illustrates the gap-type surge suppressor of the aforesaid Lee et al. patent, schematically depicted, substituted in a circuit corresponding to that of FIG. 2 for the capacitor-type suppressor of FIG. 2. Only so much of the overall circuit is illustrated as to show the location and connection of the suppresor in the circuit.

While I have shown and described a particular embodiment of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim as new and desire to secure by Letters Patent of the United States is:

1. In combination with a static circuit breaker for controlling a polyphase circuit, comprising:
  (a) a diode bridge for each phase conductor, each diode bridge comprising:
    (i) a source terminal for connection to a portion of the phase conductor at the source side of said breaker and a line terminal for connection to a portion of the phase conductor at the line side of said breaker,
    (ii) first and second diodes connected in series and arranged to provide a first conducting path through said bridge when said source terminal is positive with respect to said line terminal and arranged to block current through said first path when said line terminal is positive with respect to said source terminal,
    (iii) third and fourth diodes connected in series and arranged to provide a second conductive path through said bridge when said line terminal is positive with respect to said source terminal and arranged to block current through said second path when said source terminal is positive with respect to said line terminal.
(b) a controlled rectifier connected between said first and said second diodes for carrying currnet between said first and second diodes when said source terminal is positive with respect to said line terminal and connected between said third and fourth diodes for carrying current between said third and fourth diodes when said line terminal is positive with respect to said source terminal,
(c) means for rendering said controlled rectifier substantially non-conducting, thereby to interrupt the flow of current through its associated phase;
(d) surge suppressing means comprising:
  (i) a single surge suppressor common to the controlled rectifiers of all of said phases and having a pair of terminals,
  (ii) means for connecting said surge suppressor across the controlled rectifier in each phase, comprising, for each individual phase, a first auxiliary diode connected between one terminal of the controlled rectifier in said individual phase and one terminal of said surge suppressor and a second auxiliary diode connected between the other terminal of said controlled rectifier and the other terminal of said surge suppressor,
  (iii) said two auxiliary diodes for each phase being poled to conduct in the same direction as the controlled rectifier associated with that particular phase.

2. The combination of claim 1 in which said surge suppressor comprises a capacitor.

3. The combination of claim 1 in which said surge suppressor comprises a breakdown device.

References Cited

UNITED STATES PATENTS 3,309,593   3/1967   Egglestone et al. __ 307—202 XR

ARTHUR GAUSS, *Primary Examiner.*

JOHN ZAZWORSKY, *Assistant Examiner.*

U.S. Cl. X.R.

307—252, 257; 317—50; 328—8